Figures 1, 2, 3, 4:
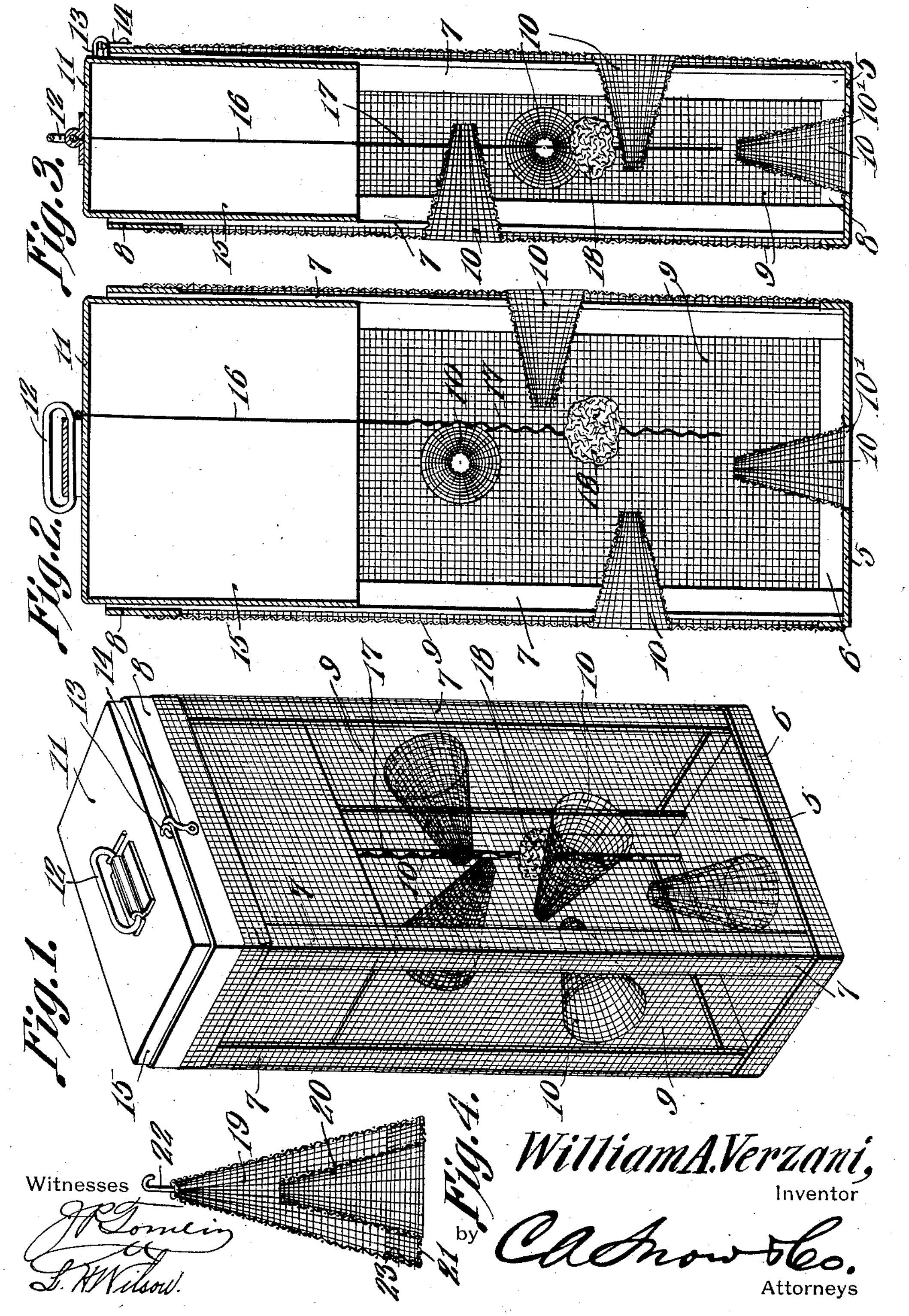

W. A. VERZANI.

FLY TRAP.

APPLICATION FILED APR. 6, 1912.

1,053,251. Patented Feb. 18, 1913.

Witnesses

J. P. Gomlin

L. H. Wilson

William A. Verzani, Inventor by C.A. Snow & Co. Attorneys

COLUMBIA PLANOGRAPH CO., WASHINGTON, D. C.

UNITED STATES PATENT OFFICE.

WILLIAM A. VERZANI, OF NEWCASTLE, NEBRASKA.

FLY-TRAP.

1,053,251. Specification of Letters Patent. Patented Feb. 18, 1913.

Application filed April 6, 1912. Serial No. 688,989.

*To all whom it may concern:*

Be it known that I, William A. Verzani, a citizen of the United States, residing at Newcastle, in the county of Dixon and State of Nebraska, have invented a new and useful Fly-Trap, of which the following is a specification.

This invention relates to fly traps, and has for its object to provide a device of this character which is simple, durable, substantial and inexpensive in construction, and which is convenient and efficient in use.

Another object of the present invention is to provide a device of this character which may be interposed between a window screen or sash and the window sill, or which may be interposed between other objects, such as doors, and the jambs of doors and the like, and which may be distended or contracted to accommodate various sized windows and the like.

A further object of the present invention is to provide a fly trap of this character which may be hung in a vertical position at any suitable locality for entrapping flies and other insects, or which may be set upon any suitable base or support.

With the foregoing and other objects in view, which will be apparent as the invention is better understood, this invention resides in the novel construction and combination of parts hereinafter described and claimed, reference being had to the accompanying drawings, wherein the invention has been illustrated, and wherein,—

Figure 1 is a perspective view of the fly trap as constructed in accordance with the present invention. Fig. 2 is a vertical or longitudinal section through the fly trap. Fig. 3 is a view similar to Fig. 2 taken in a plane at right angles thereto. Fig. 4 is a central longitudinal section of a modified form of fly trap.

Referring in detail to the drawings, the numeral 5 designates the bottom of the fly trap, which is rectangular in contour, and preferably imperforate, and which has a peripheral upstanding flange 6, and the numeral 8 designates an upper rectangular frame, which is of a size to correspond with flange 6, angle bar struts 7 being secured at their ends in the corners of the said flange 6 and the frame 8. The said parts are all preferably constructed of suitable sheet metal, which may be galvanized or otherwise plated, oxidized, or polished. The struts 7 which connect the corners of the flange 6 and the frame 8 and which forms slideways serve to space the frame and the bottom apart and also serve to hold the bottom and frame in rigid relation. The struts 7 may be secured to the frame 8 and the flange 6 is any suitable manner, such as by welding, riveting, or the like.

Reticulated, or meshed panels 9 are secured at their ends to the flange 6 and the frame 8, and are preferably attached together at their edges in order that the panels form one continuous band around the struts 7. The panels 9 may also be secured to the struts 7 at their edges when desired, it being apparent that the struts 7 prevent the panels from being distorted and thereby serve to retain the panels in position. Each of the panels 9 embodies or includes an inwardly directed conical entrance chute 10 which has its base and apex open, the various conical chutes 10 being preferably disposed in various horizontal planes, at least the conical entrance chutes of opposite sides are preferably offset relative to each other. The apices of the conical entrance chutes 10 are open to provide constricted inlets into the chamber or space within the trap in order to permit the flies to pass through the chute 10 and into the trap, the constricted inlets preventing the escape of the flies from the trap.

The rectangular cover 11, which is preferably imperforate, has a peripheral flange 15 telescoping into the upper ends of the angle bar struts or slideways 7, the flange 15 being elongated in order that the cover or closure 11 may be distended or retracted to a considerable extent. The cover 11 is provided with a hand hold or handle 12, by means of which the trap may be carried about or may be hung from a hook, bracket or the like. A staple 13 is also secured to one side of the flange 15 adjacent its upper end and is adapted to be engaged by a hook 14 pivoted to the corresponding side of the frame 8, the staple 13 being adapted to seat on the frame 8 when the hook 14 is engaged with the staple, thereby retaining the cover in position. The cover 11 is also preferably constructed of sheet metal, similar to the frame 8, bottom 5, and the struts 7.

A wire 16 is hung from the cover 11 and the lower end thereof is sinuous as designated by the numeral 17. A sponge 18 may be engaged on the lower end of the wire 16 for the purpose of absorbing syrup, or other liquid to attract the flies, or if desired, any other bait may be engaged on the wire 16. In this manner, the bait may be hung from the cover 11 in a suitable position within the trap in order to attract the flies and other insects. This fly trap may therefore be hung in any suitable locality for attracting and entrapping the flies or other insects, or the trap may be interposed between a window screen and the window sill to entrap the flies at both sides of the window and at the top and bottom. It will be noted that the cover 11 may be distended or contracted to accommodate the trap for various sized windows, the flange 15 sliding within the angle bar struts 7. This trap may be also used in various other manners, which will be apparent, and will serve to effectively exterminate flies and other insects. The flies, when entrapped, may be exterminated in any suitable manner, it being noted that the cover 11 may be removed in order to convey the flies and other insects from the trap.

The trap is simple, durable, substantial and inexpensive in construction, as well as compact, and its use is both convenient and efficient.

In the form shown in Fig. 4, the casing of the trap, designated by the numeral 19, is in the form of a cone having a hook 22 swiveled in the apex thereof, and which is open at the base. The conical entrance chute 20 projects into the lower end of the casing 19 and has its apex open to provide a constricted inlet. The base of the conical entrance chute 20 is also open and an annular flange 21 projects from the base of the said chute and has its outer edge upturned as designated by the numeral 23, which edge fits within the lower edge of the casing 19. The casing and the entrance chutes are reticulated or meshed, and may be readily taken apart when desired. It is also understood that any form of lure may be employed for attracting the flies and other insects, such as bait, or a candle or other source of light for attracting the insects. Any number of entrance chutes 10 may also be employed, and the same may be located at various positions which may be desirable or essential. This trap is also hygienic and may be readily cleansed or sterilized. It is further understood that the various parts of the trap may be made in various sizes or proportions, and that the device is otherwise susceptible of alterations or deviations in its details within the scope of the appended claims without departing from the spirit of the invention. If desired, the bottom 5 may be provided with an opening 10′ and an inlet chute 10 secured thereto and communicating with the said opening in order to admit the flies and other insects through the bottom.

Having thus described the invention, what is claimed as new is:—

1. A fly trap embodying a bottom, an upper frame, struts secured at their ends to the bottom and frame and forming slideways, reticulated panels secured to the said bottom and frame and having inlets, and a cover telescoping into the upper ends of the struts.

2. In a fly trap comprising a bottom, an upper frame, angle bar struts secured at their ends to the bottom and frame and forming slideways, reticulated panels secured to the bottom and frame and having inlets, and a cover telescoping into the upper ends of the angle bar struts.

In testimony that I claim the foregoing as my own, I have hereto affixed my signature in the presence of two witnesses.

WILLIAM A. VERZANI.

Witnesses:
C. A. KINGSBURY,
T. H. ELLIOTT.

Copies of this patent may be obtained for five cents each, by addressing the "Commissioner of Patents, Washington, D. C."